United States Patent [19]

Hata et al.

[11] Patent Number: 4,583,934

[45] Date of Patent: Apr. 22, 1986

[54] EXTRUDER FOR A FLUID MATERIAL

[75] Inventors: Shunichi Hata; Makoto Miyata; Ichirou Kishi, all of Hikone, Japan

[73] Assignee: Matsushita Electric Works, Ltd., Osaka, Japan

[21] Appl. No.: 627,857

[22] Filed: Jul. 5, 1984

[30] Foreign Application Priority Data

Aug. 5, 1983 [JP] Japan .............................. 58-144250

[51] Int. Cl.⁴ .............................................. B29C 47/00

[52] U.S. Cl. ................................ 425/376 R; 222/327; 222/386; 425/458

[58] Field of Search ............. 425/376 R, 458, DIG. 5; 222/326, 327, 386, 391; D8/14.1, 61, 68; 81/9.1 R, 45.5, 45.6; 74/422, 89.11, 89.12, 89.17, 89.19; 100/288

[56] References Cited

U.S. PATENT DOCUMENTS

| | | | |
|---|---|---|---|
| 276,326 | 4/1883 | Atkiss | 425/376 R |
| 679,983 | 8/1901 | O'Neil | 425/376 R |
| 1,693,261 | 11/1928 | Sweetland | 222/386 |
| 1,855,266 | 4/1932 | Van Eps | 91/169 |
| 3,154,811 | 11/1964 | Gardener | 425/376 R |
| 3,616,728 | 11/1971 | Kennedy | 92/51 |
| 3,685,936 | 8/1972 | Meth et al. | 425/376 R |
| 4,260,076 | 4/1981 | Bergman | 222/327 |
| 4,440,324 | 4/1984 | Lebecque | 222/386 |

*Primary Examiner*—Jay H. Woo
*Assistant Examiner*—J. Fortenberry
*Attorney, Agent, or Firm*—Stevens, Davis, Miller & Mosher

[57] ABSTRACT

An extruder for a fluid material including a cartridge containing a fluid material, and pushing members for pushing an end of the cartridge so as to extrude the fluid material. The pushing members are arranged to be driven by a system of a pinion and racks put in motion through reduction gears.

5 Claims, 24 Drawing Figures

EXTRUDER FOR A FLUID MATERIAL

BACKGROUND OF THE INVENTION

1. Field of the Invention

The present invention generally relates to an extruding tool for a fluid material, more particularly, to an extruder for thrusting out from a nozzle thereof a fluid material such as a viscous material, for example, a calking material or a sealing material or the like which is in use with waterproof and joint processing.

2. Description of the Prior Art

Heretofore, such an extruder in the prior art as shown in FIG. 1 has been used where the extruder is of cartridge-type, i.e. comprises a cartridge 10 containing a fluid material, the cartridge 10 having a nozzle 11 at one end thereof and an axially slidably movable plunger at the other end thereof. Japanese Utility Model Publication Jitsukosho No. 48-11945 defined the above class of an extruder which comprises a body 1 having a casing 2 and a pushing bar 3 mounted at the rear of the body 1. The casing 2 has a semicircular configuration in section and is open upwardly, storing therein the cartridge 10 containing a fluid material. Grasping to draw a lever 16 installed in the body 1 causes said pushing bar 3 to go forward and pulling a back end of the pushing bar 3 causes the pushing bar 3 to go backward.

Operations of this conventional extruder will be as follows when the extruder is in practical use with joint processing of wall surfaces and sealing for waterproof processing. In the first place cartridge 10 is put in the casing 2 after the pushing bar 3 is pulled back to the utmost, and then the pushing bar 3 is caused to go forward by grasping the lever 16 several times to draw it so that the fore end of the pushing bar 3 contacts with the plunger 12 of the cartridge 10. Subsequent to that, the plunger 12 arranged to axially move slidably is pushed by the pushing bar 3 going still forward, which is performed by the further grasps of drawing the lever 16. As a result, the fluid material is extruded from the nozzle 11 mounted at the fore end of the cartridge 10.

As can be seen from the above description, this preceding extruder is unsuitableness to a performance in a narrow place. When the length of the pushing bar 3 is greater, the back end of the bar extends further from the rear of the body 1 in the initial operation as described earlier.

SUMMARY OF THE INVENTION

Therefore, the object of the present invention is to provide an extruder for a fluid material having a small length which can be readily operated even in a narrow place and can positively thrust out the whole sum of the fluid material stored in a cylindrical storing member.

To accomplish the above object, an extruder for a fluid material according to the invention comprises, a cartridge containing the fluid material and having an end thereof arranged to be pushed so as to extrude the fluid material contained in the cartridge, a plurality of pushing members for pushing the end of the cartridge so as to extrude the fluid material, the pushing members extending in parallel along a direction in which the cartridge is pushed, and a driving means for driving the pushing members to move successively in the direction of pushing the end of the cartridge so as to extrude the fluid material, a displacement restraint means for restraining a subsequent pushing member from the displacement toward the pushing direction by a smaller force than a driving force applied to a preceding pushing member when the preceding pushing member is driven to move in the pushing direction by the driving means.

Accordingly, the extruder embodied by the present invention can be readily operated in a narrow place since the extruder comprises the pushing bar whose length in the initial operation is shorter than the stroke necessary to thrust out the whole sum of the fluid material.

BRIEF DESCRIPTION OF THE DRAWINGS

The features and advantages of the present invention will be apparent from the following description of the preferred embodiment taken in conjunction with the appended claims and the accompanying drawing figures wherein :

Figure 9:
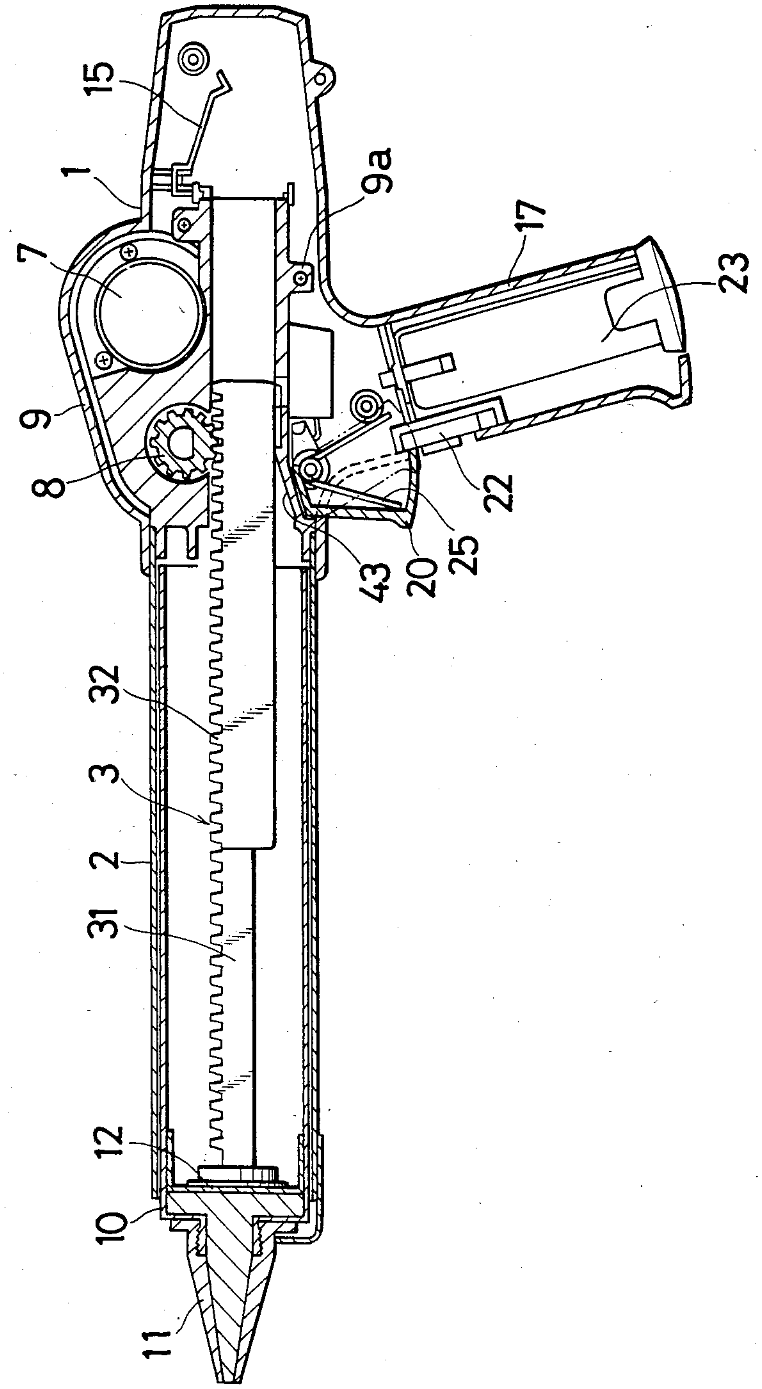
Figure 10A:
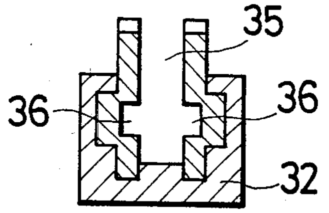

FIGS. *7a* through *7d* are cross sectional views illustrating movements of a pushing bar of the embodiment of the invention;

FIGS. *8a* and *8b* are enlarged cross sectional views showing in detail a back portion of a body of the embodiment of the invention;

FIG. 9 is a cross sectional view showig the arrangement of the embodiment of the invention;

FIG. 10*a* is a cross section taken along the line A—A of FIG. *7d;*

Figure 10B:
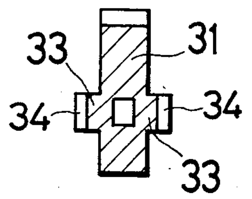

FIG. 10*b* is a cross section taken along the line B—B of FIG. *7d;*

Figure 10C:
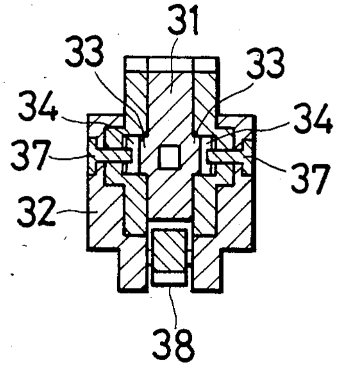

FIG. 10*c* is a cross section taken along the line C—C of FIG. *7a;*

Figure 10D:
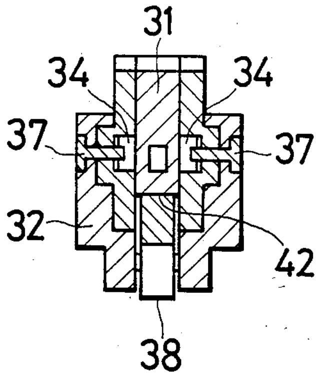

FIG. 10*d* is a cross section taken along the line D—D of FIG. *7d;*

Figure 11:
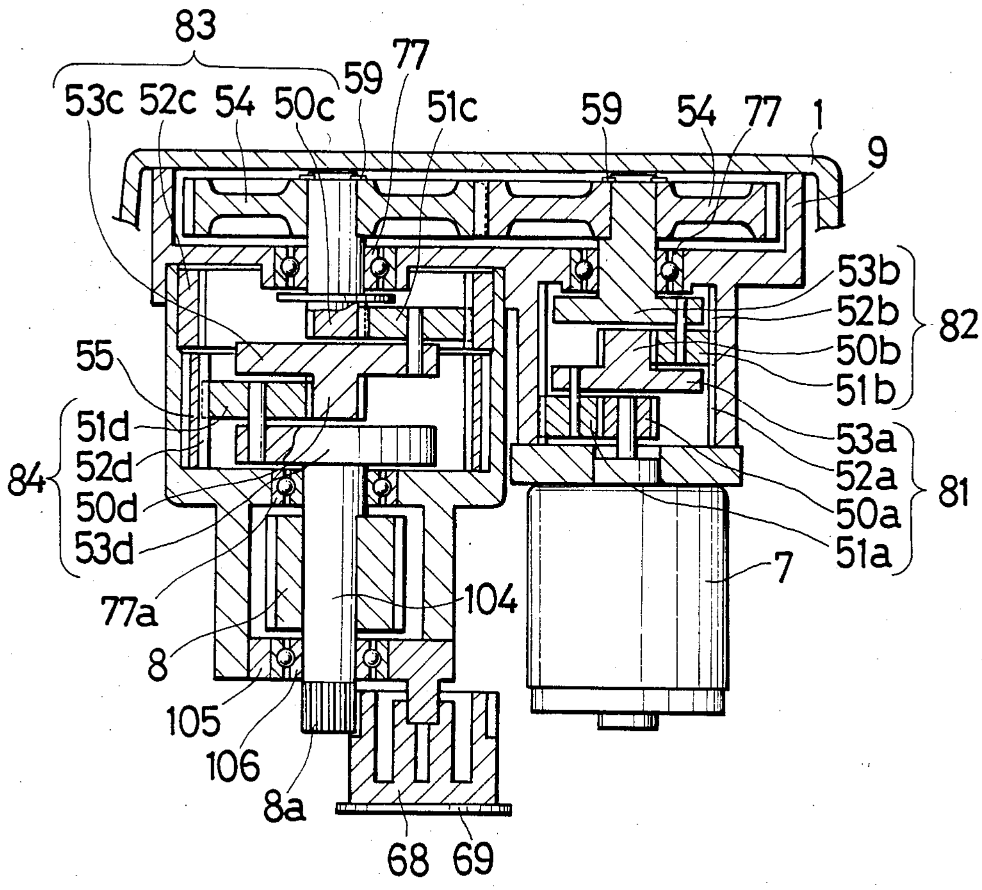
Figure 12:
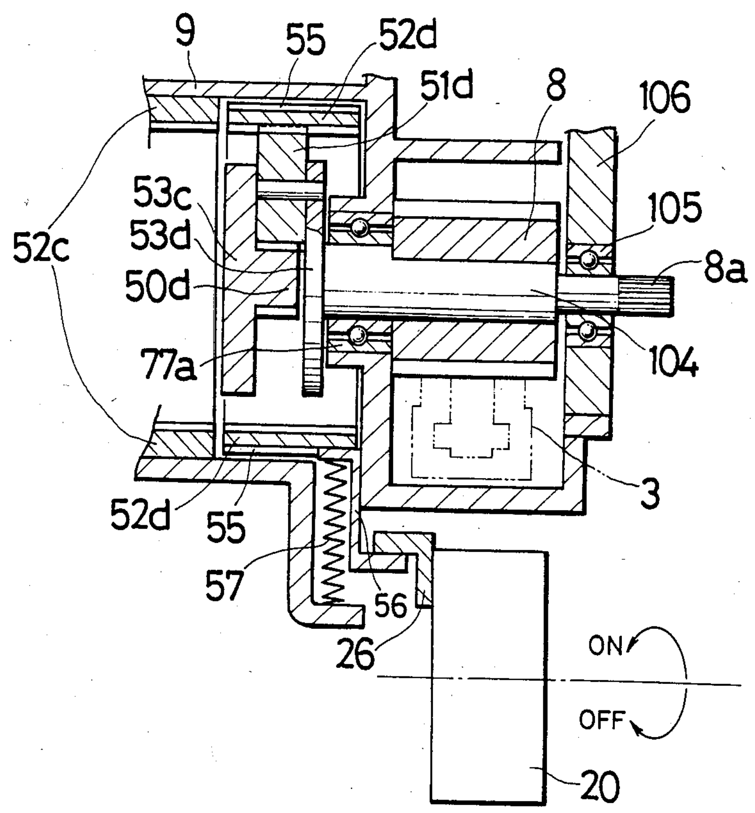
Figure 13A:
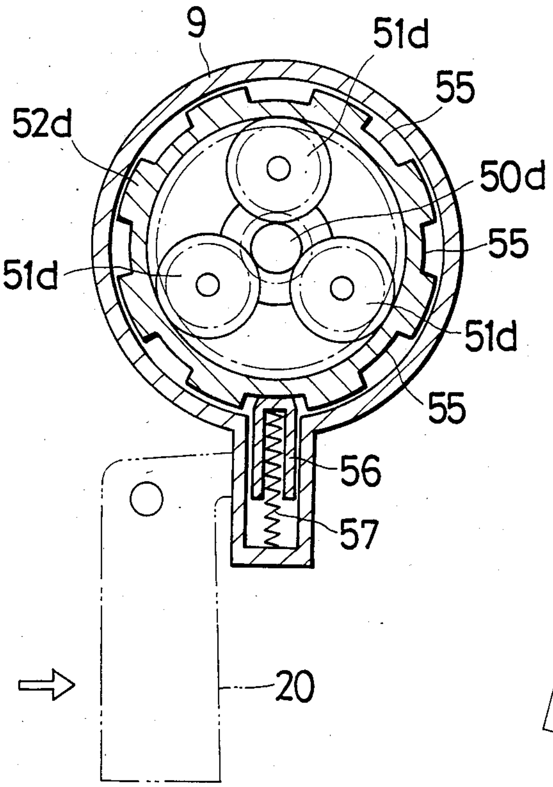
Figure 13B:
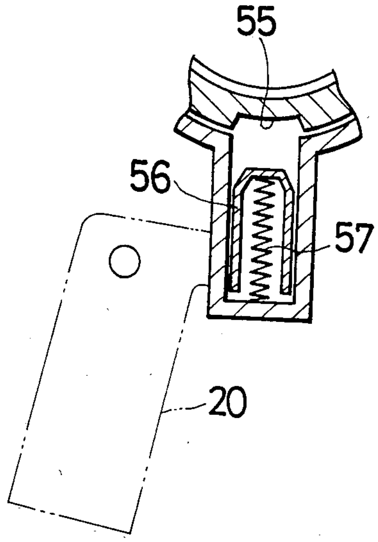
Figure 14A:
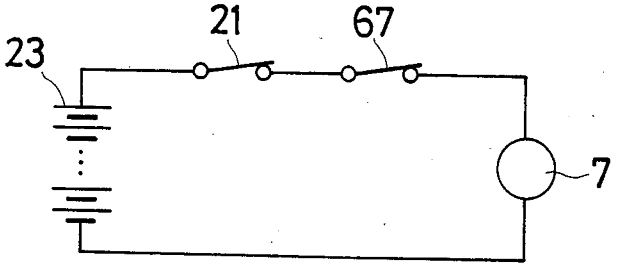
Figure 14B:
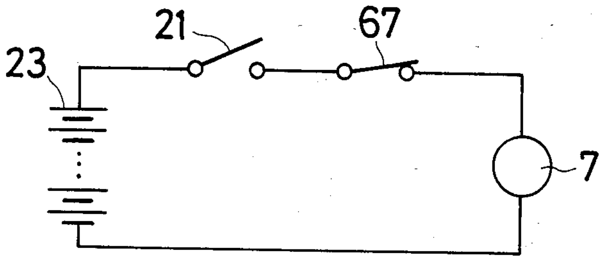
Figure 14C:
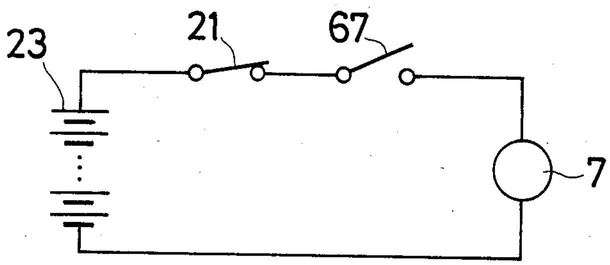

FIG. 11 is an enlarged horizontal cross sectional view showing the vicinity of the four stages 81 to 84 of planetary gear trains of the embodiment of the invention;

FIG. 12 is an enlarged vertical cross-sectional view showing the vicinity of the pinion 8 of the embodiment of the invention;

FIGS. 13*a* and 13*b* are enlarged cross sectional views showing movements of the clutch pin of the embodiment of the invention;

FIGS. 14*a* through 14*c* are electric circuit diagrams illustrating a switch system for the motor of the embodiment of the invention.

DETAILED DESCRIPTION OF THE PREFERRED EMBODIMENT

Figure 1:
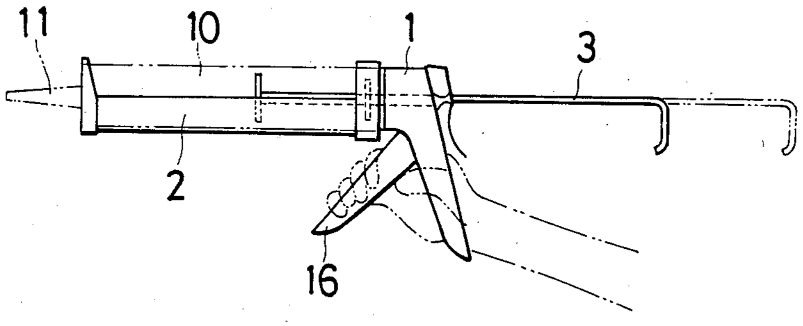
Fig. 1 Prior Art
FIG. 1 is a side elevation of an embodiment of the prior art described earlier.
Figure 2:
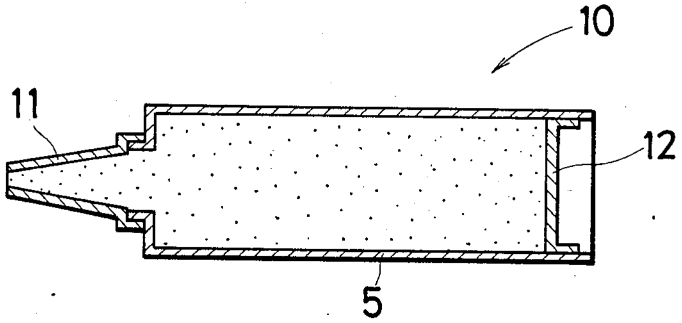
FIG. 2 is a cross section of a cartridge of an embodiment of the present invention.
Figure 3:
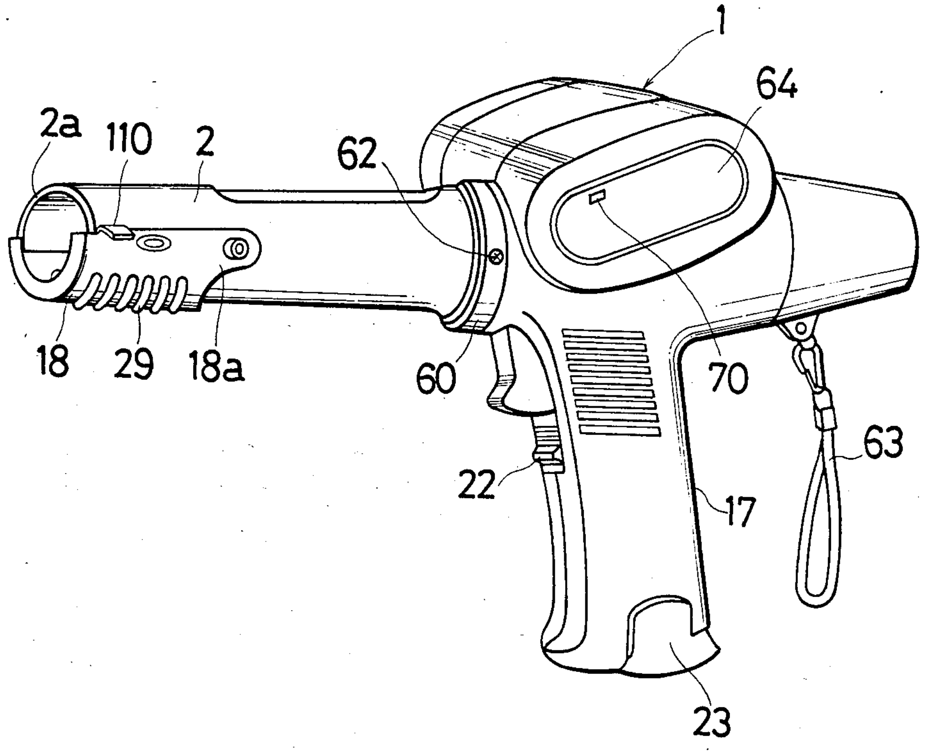
FIG. 3 is a perspective view of an embodiment of the invention.

Referring now in detail to the drawings wherein like parts bear the same numerals, there is shown in FIG. 2 a cartridge 10 comprising a cartridge housing 5 containing therein a fluid material such as a viscous material or the like, a nozzle 11, and movable plunger 12. The above viscous material is, for example, a sealing material, a calking material etc. There is shown in FIG. 3 an extruder for a fluid material according to the present invention. The extruder comprises a body 1 having a grip 17 provided thereunder and a cylindrical casing 2 secured to the front of the body 1, the casing 2 having a fore end 2*a* opened out so as to mount therethrough the cartridge 10 within the casing 2, the casing 2 further having a cover 18 having the rear 18*a* thereof mounted pivotally on the fore side portion of the cover 18. The cartridge 10 is firmly maintained in the casing 2 after the opened fore end 2*a* of the casing 2 is covered by the cover 18 with a space left for a nozzle 11 to project therefrom. Still further casing 2 includes a plurality of antiskid ribs 29 being formed in a lower surface of the cover 18 and includes a pair of projections 110 to operate the cover 18 therewith. The rear 18*a* is provided with a pair of holes 100, into which a pair of rivets 101 are inserted, thereby mounting the cover 18 pivotally on the casing 2. There is formed a pair of concave portions 102 on the inside of the cover 18 between the pair of holes 100 and the pair of projections 110. The pair of concave portions 102 are allowed to fit to and remove from a pair of convex portions 103 formed on the outisde of the casing 2, thus preventing the cover 18 from being left open.

Figure 4:
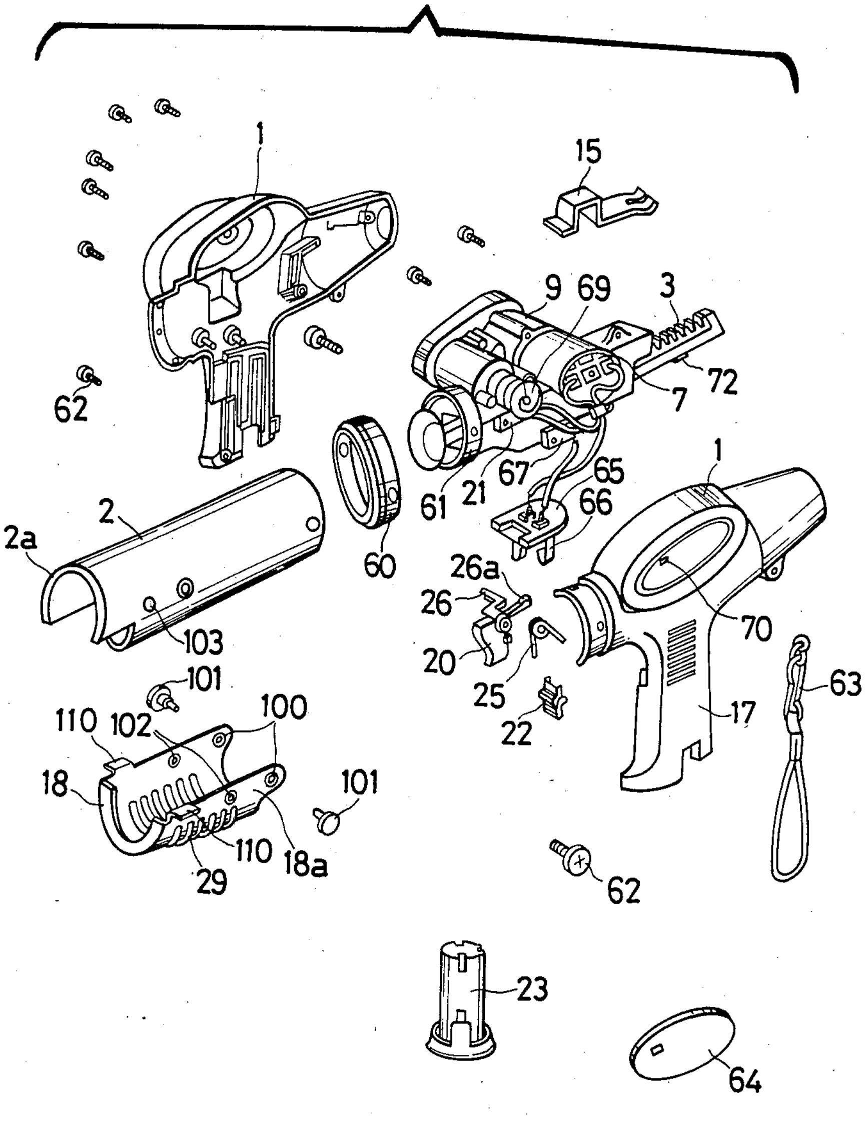
FIGS. 4 and 5 are perspective exploded views of the embodiment of the invention.
Figure 5:
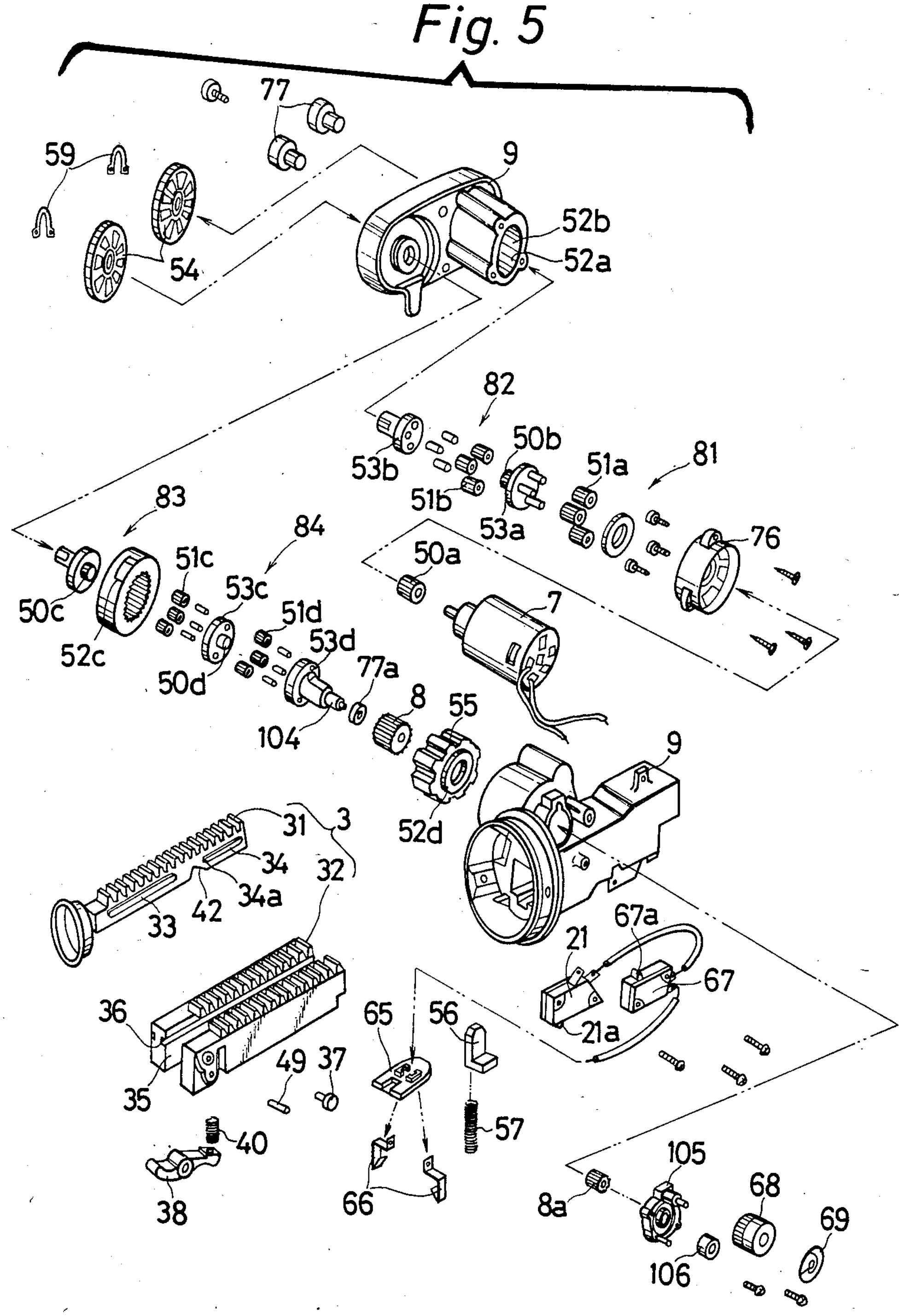
Figure 6:
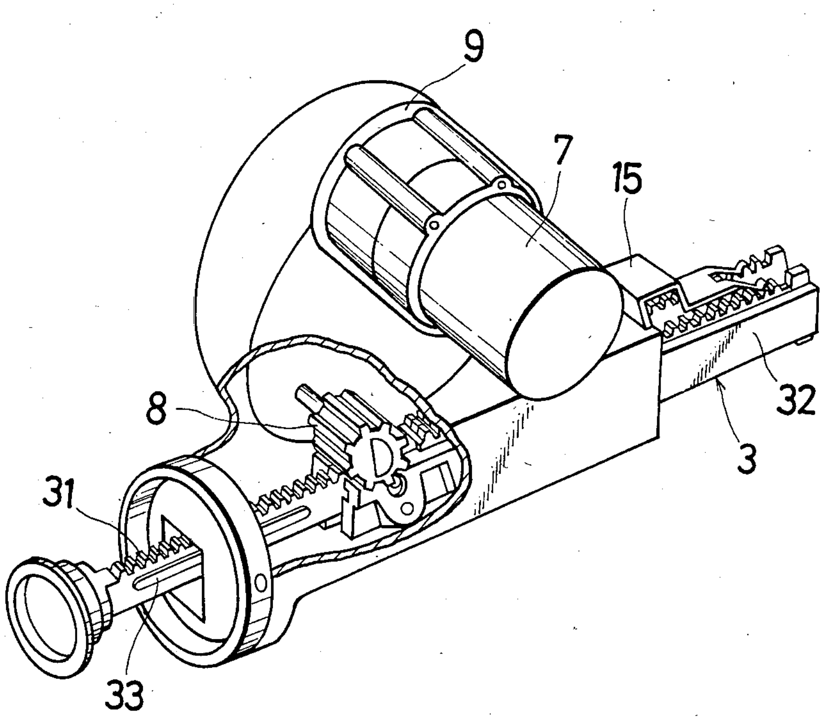
FIG. 6 is a perspective view, partly in section, of a driving means of the embodiment of the invention.

As shown in FIG. 9, a plunger 12 slidably movable axially of the cartridge 10 is pushed by a pushing bar 3. The pushing bar 3 is driven by a motor 7 stored in a gear case 9 in the body 1. The grip 17 has a battery package 23 stored therein for a power source, a switch lever 20 installed to the front of the grip 17, and a lock 22 positioned under the switch lever 20 for locking the switch lever 20. The switch lever 20 actuates a switch 21 shown in FIGS. 14*a* and 14*b* to control the connection between the motor 7 and the battery package 23. The casing 2 is secured to the body 1 in such a way as shown in FIGS. 3 and 4 that an opened rear end of the casing 2 is fixed to a flange 61 by means of a ring 60 to fasten and of a tapping screw 62, the flange 61 being formed circumferentially in an external peripheral margin opened for the pushing bar 3 in the gear case 9 to thrust therethrough. The body 1 is provided with a suspending cord 63 for suspending the extruder and a brand plate 64. A driving means for driving the pushing bar 3 is constituted by not only the motor 7 in the gear case 9 but also reduction gears for reducing outputs of the motor 7 and a pinion 8 driven by reduction outputs, the pinion 8 meshing with racks formed on the pushing bar 3 so as to drive the pushing bar 3. The pushing bar 3 is composed of two members, a first rack body 31 having a rack formed on the upper surface thereof and a second rack body 32 having likewise racks formed on the upper surface thereof. As shown in FIG. 5, the first rack body 31 has a guide rib 33 disposed in a fore portion of each longitudinal side thereof and a guide rib 34 disposed in a back portion of each longitudinal side thereof, the guide rib 34 having more of thickness than the guide rib 33. The second rack body 32 is composed of two parts, each part having a rack formed on an upper surface thereof. As shown in FIG. 10*a*, there is formed between the two parts a concave groove 35 into which the first rack body 31 fits. Furthermore there are formed in the inner wall of the concave groove 35 two guide grooves 36 with which the guide ribs 33 and 34 of the first rack body 31 associate slidably. Still more, as shown in FIG. 10*c*, there are provided in the two guide grooves 36 two pins 37 projecting therefrom so as to be adapted to contact with a fore end 34*a* of the guide rib 34. The first rack body 31 and the second rack body 32 are so arranged to join together that a detent 38 is fitted to a concave portion 42 formed in a lower surface of a back portion of the rack body 31, the detent 38 being rotatably supported by a pin 49 disposed in a fore portion of the second rack body 32 and being energized for rotation by a spring 40. There is formed in a lower portion 9*a* of the gear case 9 a slant surface 43 for pressing the joint member 38 against the force of the spring 40 so as to release from the concave portion 42 the joint member 38 fitted thereto.

Figure 7A:
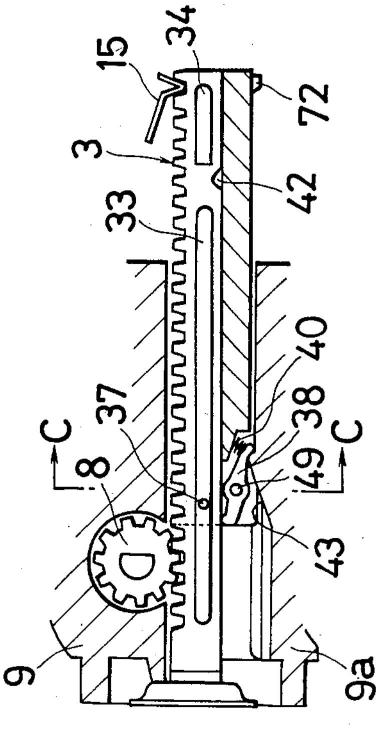
Figure 7B:
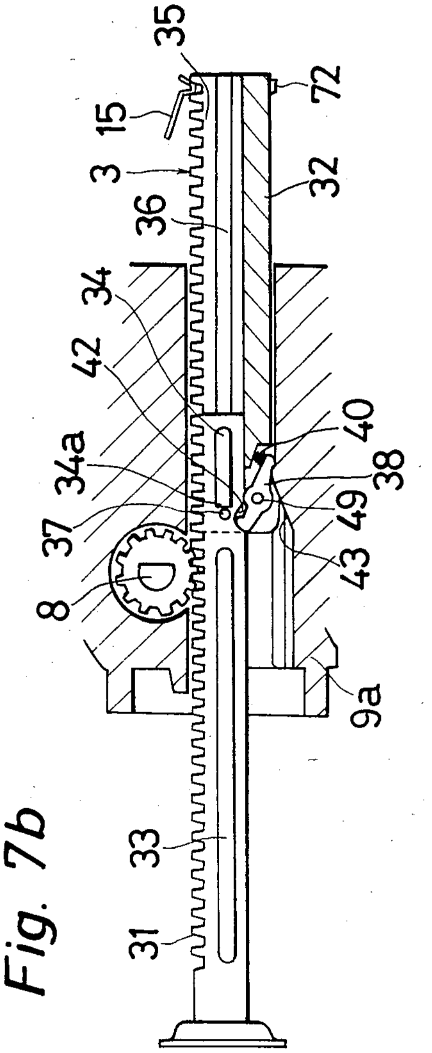
Figure 7C:
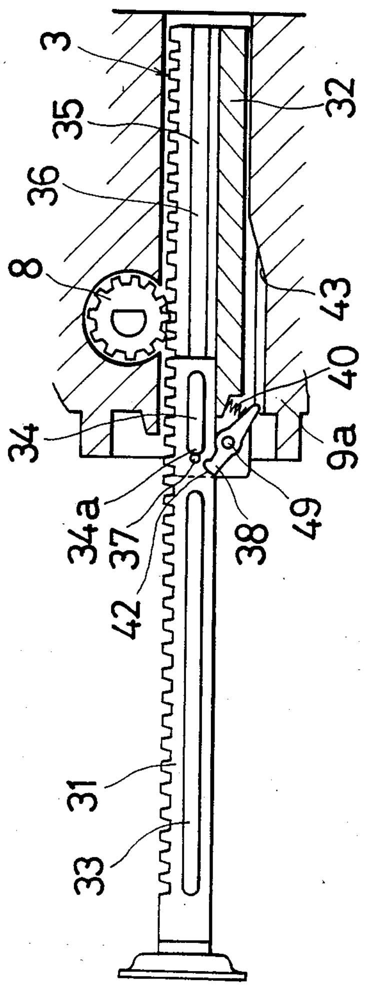
Figure 7D:
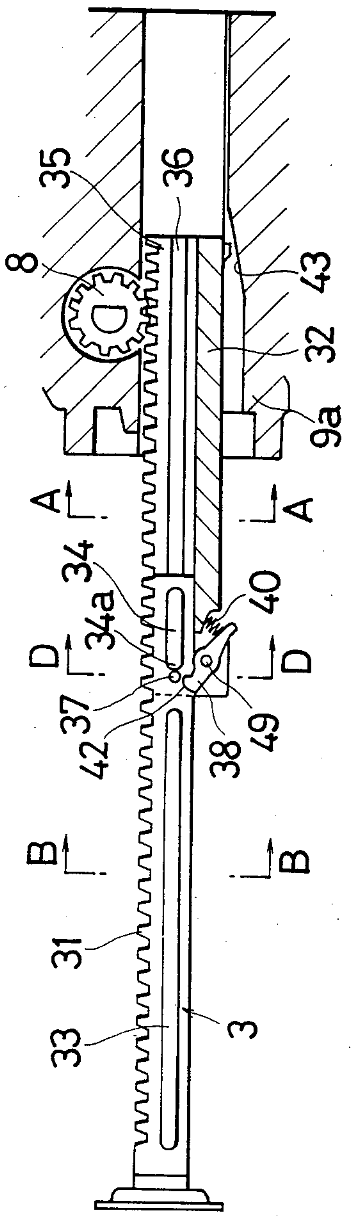

FIG. 7*a* through 7*d* illustrate modes of an advancement of the pushing bar 3 according to the invention. Only the first rack body 31 advances slowly meshing with the pinion 8 in the first place as indicated by FIG. 7*a*. Then, as shown in FIG. 7*b*, the second rack body 32 also moves forward after the fore end 34*a* of the guide rib 34 of the first rack body 31 contacts with the pin 37 of the second rack body 32. Next, when the detent 38 is fitted to the concave portion 42 and the second rack body 32 reaches a position whereat to mesh with the pinion 8 as shown in FIG. 7*c*, the second rack body 32 is driven to advance by the pinion 8. Subsequent to that, the second rack body 32 continues to move forward pushing the first rach body 31 as shown in FIG. 7*d*. As can be understood hereinbefore, it is possible to allow the length of the pushing bar 3 at the initial retreat stage to be almost half of the stroke necessary to push the plunger 12 so as to thrust out the whole quantity of the fluid material contained in the cartridge 10 since the pushing bar 3 is constituted by two members the first and second rack bodies and the former is enclosed with respect to the partial circumference thereof by the latter, just as incorporated in the latter, at the initial retreat stage according to the invention. Furthermore, the pushing bar 3 may then have a short length projecting backward at the initial retreat stage.

Figure 8A:
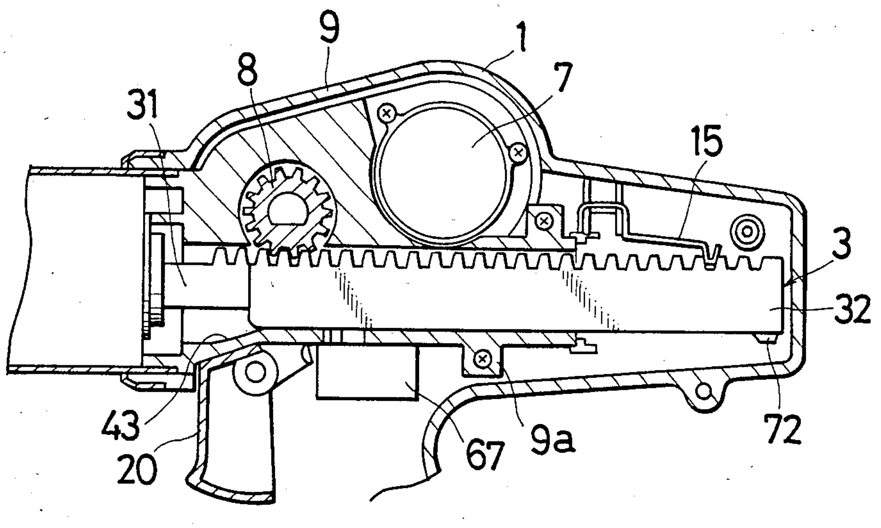
Figure 8B:
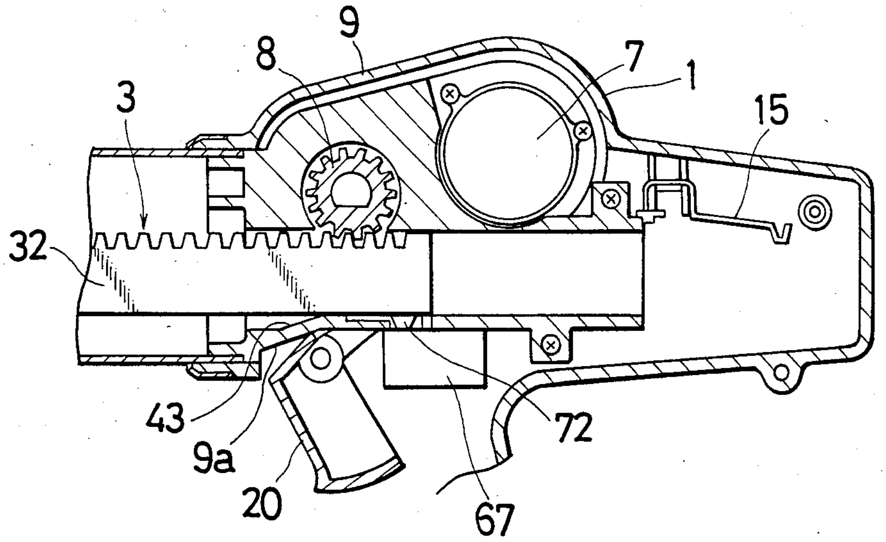

As shown in FIGS. 8*a* and 8*b*, there is prepared in a back inside of the body 1 a spring 15 having the ends thereof forked as indicated in detail by FIG. 4. Stating precisely, the spring 15 applies a load to the advancement of the second rack body 32 with each forked end of the spring 15 being engaged with the each back end's tooth of a pair of racks of the second rack body 32, thereby preventing the second rack body 32 from moving forward to lose the required stroke owing to the existing friction between the first rack body 31 and the second rack body 32 in the initial operation in which only the first rack body 31 has to move forward. Needless to say, the applied load must be made smaller than the driving force caused by the pinion 8. Due to the spring 15 performing the aiding function as described above, the second rack body 32 won't move forward till the first rack body 31 extends to length thereof, which arrangement enables the whole sum of the fluid material in the cartridge 10 to be positively thrust out as shown in FIG. 9.

It is not an output of the motor 7 that is employed to restore the pushing bar 3 to the initial position. The performance of restoring the pushing bar 3 is to be fulfilled by a new cartridge with which the used up cartridge 10 is replaced. Therefore the fluid material is capable of being thrust out from the nozzle 11 immediately after mounting the new cartridge in the casing 2, without preliminarily advancing the pushing bar 3 in order for the fore end thereof to contact with the plunger 12, even in the case where the new cartridge to be mounted has a short length or has been already used in some degree so that the plunger 12 has been somewhat forwardly displaced.

To do this, the extruder comprises a drive release means for releasing the pushing bar 3 from a driving means, the drive release means making use of the characteristic of planetary gear trains used as reduction gears between the motor 7 and the pinion 8. As depicted in FIG. 5, the reduction gears are constituted by four stages of planetary gear trains in all, that is, the first stage 81, the second stage 82, the third stage 83, and the fourth stage 84. The first and second stages are adjusted coaxially, the third and fourth stages are likewise adjusted coaxially, and the pair of two stages is placed in parallel. The respective stages 81 to 84 of planetary gear trains are composed of sun gears 50*a* to 50*d*, planetary gears 51*a* to 51*d* meshing individually with the sun gears 50*a* to 50*d*, internal gears 52*a* to 52*d* meshing individually with the planetary gears 51*a* to 51*d*, and planetary carriers 53*a* to 53*d* supporting individually the planetary gears 51*a* to 51*d*. The sun gear 50*b* in the second stage 82 and the sun gear 50*d* in the fourth stage are configured to be integral with the planetary carrier 53*a* in the first stage and the planetary carrier 53*c* in the third stage, respectively. The pinion 8 is fixed through a bearing 77*a* to the output shaft 104 integral with the planetary carrier 53*d* in the last stage. A pair of spur gears 54 connect the planetary carrier 53*b* in the second stage 82 to the planetary carrier 53*c* in the third stage 83.

In the above gear assembly, the input received by the sun gear 50*a* to 50*d* is to be converted into the reduction output through the planetary carriers 53*a* to 53*d* with the internal gears 52*a* to 52*d* held from rotation. The internal gears 52*a* to 52*c* in the respective stages except in the fourth stage are arranged to be integral with or fixed to the gear case 9, whereas the internal gear 52*d* in the fourth stage is adapted to be rotatable with respect to the gear case 9, having a plurality of concave portions 55 in the external peripheral surface thereof. There is disposed in the gear case 9 a clutch pin 56 being slidably movable to be fitted into one of the concave portions 55. And the switch lever 20 is provided with a projection 26 to be fitted to the clutch pin 56, and a projection 26*a* to actuate a terminal 21*a* of the switch 21. While the triggerlike switch lever 20 is pulled so that the switch 21 is closed as shown in FIG. 14*a* by means of the projection 26*a* so as to actuate the motor 7, the clutch pin 56 moves upwardly by means of a spring 57 and is fitted into one of the concave portions 55 of the internal gear 52*d* as shown in FIG. 12 and FIG. 13*a*, thereby preventing the internal gear 52*d* from rotating. Hence the rotation output of the motor 7 is transmitted to the pinion 8 through the gear assembly of the four stages 81 to 84. On the contrary, when the pushing bar 3 reaches the position of the maximum advancement thereof, a terminal 67*a* of the switch 67 is actuated by means of a projection 72 disposed at the back end of the pushing bar 3 so that the switch 67 is opened as shown in FIG. 14*c* to stop the motor 7; thus an extruding operation is completed. Meanwhile, in the case where pulling the trigger-like switch lever 20 is ceased by removing fingers in course of that operation in order that the switch 21 is opened as shown in FIG. 14*b* to make the motor 7 stationary, the projection 26 pushes downward the clutch pin 56 against the force of the spring 57 by means of a reset spring 25 for resetting the switch lever 20, so that one of the concave portions 55 of the internal gear 52*d* is released from the clutch pin 56 fitted thereinto, with the result that the internal gear 52*d* in the fourth stage 84 is allowed to rotate for the purpose of enabling the planetary carrier 53*d* in that stage to idle. Consequently the pinion 8 and the pushing bar 3 are set free from the motor 7.

FIG. 5 additionally shows a stand 76 for fixing the motor 7, bearings 77, locks 59, a terminal plate 65 for the switches 21 and 67, terminals 66 for connecting the terminal plate 65 to a terminal of the battery package 23, a cover 105 serving to accomodate the pinion 8 in the gear case 9, a bearing 106 intervening between the cover 105 and the output shaft 104, a gear 8*a* mounted on the front end of the output shaft 104 and driven to rotate by the reduction output of the pinion 8, a gear 68 meshing with the gear 8*a*, an indication 69 labeled to the gear 68 to indicate the amount of the fluid material remaining in the cartridge 10 through the window 70 shown in FIG. 3.

In the case of exchanging the cartridge 10 with a new cartridge after all of the fluid material has been thrust out, the used up cartridge 10 is taken out of the casing 2 by operating the cover 18 so as to open wide the opened fore end 2*a* of casing 2 without restoring the pushing bar 3 to the initial position, then the new cartridge 10 is put in the casing 2 through the opened fore end 2*a* of the casing 2 with the pushing bar 3 placed in the advanced position, finally the cover 18 is closed. As the new cartridge is put into the casing 2, the pushing bar 3 is capable of being pushed rearward since the pinion 8 engaging with the pushing bar 3 is set free from the motor 7 while the trigger-like switch lever 20 is not pulled as described earlier. In the above operation, firstly the first rack body 31 and the second rack body 32 of the pushing bar 3 are integrally moved backward, being conjoined with each other, secondly the detent 38 joining together the first rack body 31 and the second rack body 32 is pressed by the slant surface 43 disposed in the gear case 9 so as to disjoin the first rack body 31 from the second rack body 32 when the second rack body 32 returns to the initial position to be engaged with the spring 15 again, which leads to the first rack body 31 returning likewise to the initial position to be incorporated in the second rack body 32. Additionally it is possible to discharge fluid material immediately after completion of putting the new cartridge 10 in the casing 2 since the pushing bar 3 is in contact with the plunger 12 by virtue of the arrangement that the pushing bar 3 moves backward with the fore end thereof continuously in contact with the plunger 12 of the cartridge 10 in the above operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An extruder for a fluid material comprising:

a casing for holding a cartridge containing a fluid material and having an end thereof arranged to be pushed so as to extrude the fluid material contained in said cartridge;

a plurality of pushing members for pushing said end of the cartridge so as to extrude the fluid material, said pushing members extending in parallel along a direction in which the cartridge end is pushed;

a driving means for driving the pushing members to move successively in the direction of pushing the end of the cartridge so as to extrude the fluid material; and a displacement restraint means for restraining a subsequent pushing member from displacement toward the pushing direction and restrained by a smaller force than a driving force applied to a preceding pushing member when the preceding pushing member is driven to move in the pushing direction by the driving means;

each of said pushing members having a rack formed on a side thereof facing in the same direction; and said driving means comprises a pinion positioned to mesh with the rack of the preceding pushing member to move it in the pushing direction when the subsequent pushing member is in its initial position.

2. An extruder as recited in claim 1, wherein said pushing members comprise two members which are so arranged that one of the two members which is to be first driven is partially enclosed circumferentially by the other member which is to be secondly driven.

3. An extruder as recited in claim 1, wherein said displacement restraint means is a spring associated with the pushing member other than the pushing member to be first driven.

4. An extruder as recited in claim 1, wherein said driving means further comprises:

a detent to be fitted into a concave portion formed on a preceding pushing member, said detent disposed in a subsequent pushing member to be swingable about an axis perpendicular to the pushing direction.

5. An extruder for a fluid material comprising:

a casing for holding a cartridge containing a fluid material and having an end thereof arranged to be pushed so as to extrude the fluid material contained in said cartridge;

a plurality of pushing members for pushing said end of the cartridge so as to extrude the fluid material, said pushing members extending in parallel along a direction in which the cartridge end is pushed;

a driving means for driving the pushing members to move successively in the direction of pushing the end of the cartridge so as to extrude the fluid material; and a displacement restraint means for restraining a subsequent pushing member from displacement toward the pushing direction and restrained by a smaller force than a driving force applied to a preceding pushing member when the preceding pushing member is driven to move in the pushing direction by the driving means;

said pushing members comprising two members with the member to be first driven being positioned within and partially enclosed circumferentially by the other member which is to be secondly driven.

* * * * *